Patented Apr. 17, 1945

2,374,158

UNITED STATES PATENT OFFICE 2,374,158

MONOAZO DYESTUFFS

Arthur Howard Knight and William Elliot Stephen, Blackley, Manchester, England, assignors to Imperial Chemical Industries Limited, a corporation of Great Britain No Drawing. Application May 17, 1943, Serial No. 487,366. In Great Britain June 15, 1942

4 Claims. (Cl. 260—199)

The present invention relates to new monoazo acid dyestuffs suitable for colouring animal fibres.

According to the invention we make the dyestuffs by diazotising an amine of the general formula X—CO—NY—R—NH$_2$ in which R stands for a m- or p-phenylene residue which may carry simple azo dyestuff substituents, for example, methyl, methoxy or sulphonic acid groups, but is devoid of nitro groups, X stands for a monochloro- or monobromo-alkyl ($C_1$ to $C_3$) radical, and Y stands for hydrogen, alkyl ($C_1$ to $C_6$), cycloalkyl, aralkyl, alkoxyalkyl, or aryl, and coupling under neutral or alkaline conditions the diazo compound so-obtained with 2-amino-8-naphthol-6-sulphonic acid or a derivative thereof in which the amino group carries as substituents alkyl, cycloalkyl, aralkyl or hydroxyalkyl groups.

Also according to the invention we use the dyestuffs for colouring animal fibres, e. g., wool and silk.

The present dyestuffs dye wool from an acid bath in various shades of brown, the dyeings being characterised by very good fastness to severe washing and milling and good fastness to light.

As examples of diazo components which can be employed according to the invention, we mention:

4-amino-1-N-ethyl-omega-chloroacetanilide,
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion-toluidide,
3-amino-omega-chloroacetanilide-4-sulphonic acid,
2-amino-4-N-ethyl-omega-chloroacet-toluidide,
4-amino-2-N-ethyl-α-bromobutyryl-toluidine,
4-amino-2-N-ethyl-α-bromopropion-toluidide,
4-amino-2-N-ethyl-omega-chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega-chloroacetanilide-3-sulphonic acid,
4-amino-2-N-ethyl-omega-chloroacetanisidide,
4-amino-1-N-n-butyl-omega-chloroacetanilide-2-sulphonic acid,
4-amino-1-N-ethyl-omega-bromoacetanilide,
4-amino-1-N-benzyl-omega-chloroacetanilide,
4-amino-1-N-cyclohexyl-omega-chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl-omega-chloropropionanilide,
4-amino-1-N-cyclohexyl-omega-bromopropionanilide,
4-amino-1-N-cyclohexyl-α-bromopropionanilide,
4-amino-1-N-cyclohexyl-omega-bromo-acetanilide,
4-amino-2-N-benzyl-omega-chloro-acetanisidide,
3-amino-1-N-benzyl-omega-chloropropionanilide (obtainable by methods described in British Patent No. 544,409 or our U. S. Patent No. 2,346,492),
4-amino-1-N-β-ethoxyethyl-omega-chloroacetanilide (obtainable by acetylating N-β-ethoxyethylaniline, nitrating, removing the acetyl group by hydrolysing, causing the resulting 4-nitro-1-N-β-ethoxyethylaniline to react with chloroacetyl chloride and reducing), and 4-amino-1-N-cyclohexyl-omega-chloroacetanilide-2-sulphonic acid (obtainable by chloroacetylating sodium 4-nitro-1-N-cyclohexylaniline-2-sulphonate and reducing).

As examples of coupling components which can be employed according to the invention, we mention:

2-amino-8-naphthol-6-sulphonic acid,
2-N-methylamino-8-naphthol-6-sulphonic acid,
2-N-ethylamino-8-naphthol-6-sulphonic acid,
2-N-dimethylamino-8-naphthol-6-sulphonic acid,
2-N-diethylamino-8-naphthol-6-sulphonic acid,
2-N-ethyl-N-β-hydroxyethylamino-8-naphthol-6-sulphonic acid,
2-N-β-hydroxyethylamino-8-naphthol-6-sulphonic acid,
2NN-ββ'-dihydroxydiethylamino-8-naphthol-6-sulphonic acid,
2-N-cyclohexylamino-8-naphthol-6-sulphonic acid, and
2-N-benzylamino-8-naphthol-6-sulphonic acid (The last two coupling components in the above list are prepared by reaction between 2-amino-8-naphthol-6-sulphonic acid and cyclohexylamine or benzylamine in the presence of sodium bisulphite in aqueous medium.)

The invention is illustrated, but not limited, by the following examples in which the parts are by weight.

Example 1

21.25 parts of 4-amino-1-N-ethyl-omega-chloroacetanilide are dissolved in a mixture of 300 parts of water and 25 parts of 36% hydrochloric acid. To the resulting solution 6.9 parts of sodium nitrite are added. The solution of the diazo compound so-obtained is cooled to 5°–10° C. The cooled solution is added gradually to a stirred mixture of 26.1 parts of sodium 2-amino-8-naphthol-6-sulphonate, 600 parts of water, 80 parts of sodium chloride and 21 parts of anhydrous sodium carbonate at 5°–7° C. Coupling is rapid. The precipitated dyestuff is filtered off, washed with 10% sodium chloride solution, and dried.

The new dyestuff dyes wool in reddish brown shades from a dyebath containing sulphuric acid and Glauber's salt, the dyeings having very good fastness to severe washing and milling.

*Example 2*

21.25 parts of 4-amino-1-N-ethyl-omega-chloroacetanilide are diazotised as in Example 1. The diazo solution obtained is cooled to 5°–10° C. The cooled solution is added to a stirred solution of 27.6 parts of sodium 2-methylamino-8-naphthol-6-sulphonate in 600 parts of water containing 21 parts of anhydrous sodium carbonate at 5°–10° C. Coupling is rapid. 100 parts of sodium chloride are added. The precipitated dyestuff is filtered off and dried.

The new dyestuff is violet-black. It dissolves in water to a brownish-red solution and in concentrated sulphuric acid to a dull red solution. It dyes wool in brown shades from a dyebath containing sulphuric acid and Glauber's salt, the dyeings having very good fastness to severe washing and milling and good fastness to perspiration.

*Example 3*

26.65 parts of 4-amino-1-N-cyclohexyl-omega-chloroacetanilide are dissolved in a mixture of 400 parts of water and 25 parts of 36% hydrochloric acid. 7.0 parts of sodium nitrite in 50 parts of water are added, the temperature being 15–30° C. The resulting solution of the diazo compound, after clarification by filtration if necessary, is cooled to 5°–10° C. The cooled solution is added gradually with stirring to a cooled solution of 27.6 parts of sodium 2-methylamino-8-naphthol-6-sulphonate in 600 parts of water containing 21 parts of anhydrous sodium carbonate. 80 parts of sodium chloride are added. The precipitated dyestuff is filtered off and dried.

The new dyestuff dyes wool from an acid dyebath in brown shades, the dyeings having very good fastness to severe washing, milling and perspiration.

If 29 parts of sodium 2-N-ethylamino-8-naphthol-6-sulphonate are used in place of the 27.6 parts of the sodium 2-N-methylamino-8-naphthol-6-sulphonate employed above, a dyestuff having similar properties is obtained.

*Example 4*

27.85 parts of 4-amino-1-N-cyclohexyl-omega-chloropropionanilide are diazotised in the same way as 4-amino-1-N-cyclohexyl-omega-chloroacetanilide in Example 3. The diazo solution is filtered, cooled to 5°–10° C. and added to a stirred solution at 5°–10° C. of 34.5 parts of sodium 2-cyclohexylamino-8-naphthol-6-sulphonate in 600 parts of water containing 21 parts of anhydrous sodium carbonate. The mixture is stirred for some hours after which the new dyestuff is filtered off, washed with 5% aqueous sodium chloride and dried.

The new dyestuff dyes wool from an acid bath in nigger brown shades, the dyeings having good fastness to severe washing, milling and light.

*Example 5*

22.65 parts of 4-amino-1-N-ethyl-omega-chloropropionanilide are dissolved in a mixture of 300 parts of water and 25 parts of 36% hydrochloric acid. To the resulting solution 6.9 parts of sodium nitrite are added. The diazo solution so-obtained is filtered if necessary and added at 5°–10° C. to a similarly cooled and stirred solution of 29 parts of sodium 2-ethylamino-8-naphthol-6-sulphonate in 600 parts of water containing 21 parts of anhydrous sodium carbonate. Coupling is rapid and, when complete, 80 parts of sodium chloride are added. After stirring the mixture for some hours the new dyestuff is filtered off, washed with 5% aqueous sodium chloride and dried.

The new dyestuff forms a dark brown powder which dissolves in water to give a reddish brown solution and in concentrated sulphuric acid to form a yellowish red solution. It dyes wool from a dyebath containing sulphuric acid and Glauber's salt in brown shades of good fastness to severe washing, milling and light.

*Example 6*

The sodium 2-ethylamino-8-naphthol-6-sulphonate employed in Example 5 is replaced by a corresponding amount of sodium 2-methylamino-8-naphthol-6-sulphonate.

A dyestuff is obtained which yields on wool slightly redder shades of brown than that of Example 5, the dyeings having similar fastness properties.

*Example 7*

22.65 parts of 4-amino-2-N-ethyl-omega-chloroacet-toluidide are dissolved in a mixture of 300 parts of water and 25 parts of 36% hydrochloric acid. To the resulting solution 6.9 parts of sodium nitrite are added. The diazo solution is cooled to 5°–10° C. and added simultaneously with a 6% aqueous solution of sodium bicarbonate to 34.5 parts of sodium 2-cyclohexylamino-8-naphthol-6-sulphonate in 600 parts of water at 5–10° C., the additions being made slowly and at such rates that the coupling medium is kept neutral to litmus. The new dyestuff so obtained is precipitated by the addition of 5% sodium chloride (weight for volume), filtered off, washed with 5% aqueous sodium chloride and dried.

The new dyestuff dyes wool from a dyebath containing sulphuric acid and Glauber's salt in orange-brown shades of good fastness to severe washing and milling.

*Example 8*

22.65 parts of 4-amino-1-N-iso-propyl-omega-chloroacetanilide are diazotised in the same way as 4-amino-1-N-ethyl-omega-chloroacetanilide in Example 1. The diazo solution is added during 10–15 minutes to a stirred solution at 10° C. of 35 parts of sodium 2-NN-$\beta\beta'$-dihydroxydiethylamino-8-naphthol-6-sulphonate in 600 parts of water to which 21 parts of anhydrous sodium carbonate have been added. Stirring is continued for three hours. The new dyestuff is then precipitated by the addition of sufficient sodium chloride to give a 12% (weight by volume) solution. It is filtered off, washed with 15% aqueous sodium chloride and dried.

The new dyestuff dyes wool from an acid bath in yellowish brown shades, the dyeings having very good fastness to severe washing, milling and perspiration and good fastness to light.

*Example 9*

22.65 parts of 4-amino-1-N-ethyl-omega-chloropropionanilide are diazotised as described in Example 5.

The diazo solution is added to 35.5 parts of sodium 2-N-benzylamino-8-naphthol-6-sulphonate dissolved in 600 parts of water containing 21 parts of anhydrous sodium carbonate. When coupling is complete 80 parts of sodium chloride are added, the mixture stirred for 3-4 hours and the precipitated dyestuff filtered off and dried.

The new dyestuff dyes wool from a dyebath containing sulphuric acid and Glauber's salt in red-brown shades, the dyeings having good fastness to severe washing, milling and perspiration.

The invention is further illustrated by the dyestuffs listed in the following table.

2. The dyestuff which in the form of its acid is represented by the formula

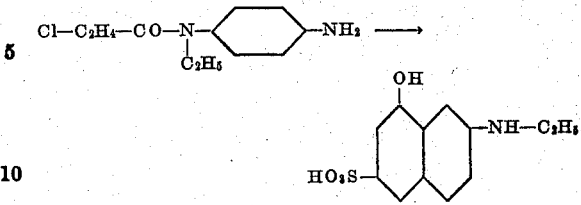

| Example No. | Diazo component | Coupling component | Shade given by the dyestuff on wool |
|---|---|---|---|
| 10 | 4-amino-2-N-ethyl-omega-bromopropiontoluidide | 2-ethylamino-8-naphthol-6-sulphonic acid | Reddish brown. |
| 11 | 4-amino-1-N-β ethoxyethyl-omega-chloroacetanilide | ___do___ | Brown. |
| 12 | ___do___ | 2-amino-8-naphthol-6-sulphonic acid | Red-brown. |
| 13 | 3-methyl-1-N-benzyl-omega-chloroacetanilide | 2-methylamino-8-naphthol-6-sulphonic acid | Do. |
| 14 | 4-amino-2-N-ethyl-α-bromopropiontoluidide | 2-ethylamino-8-naphthol-6-sulphonic acid | Reddish-brown. |
| 15 | 4-amino-1-N-cyclohexyl-omega-chloroacetanilide | 2-cyclohexylamino-8-naphthol-6-sulphonic acid | Nigger brown. |
| 16 | 4-amino-2-N-ethyl-omega-chloroacetoluidide | 2-N-ethyl-N-β-hydroxyethylamino-8-naphthol-6-sulphonic acid. | Yellowish brown. |

We claim:
1. An azo dye which in the form of its acid is represented by the formula

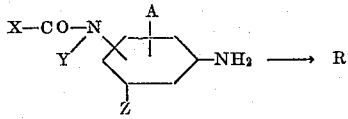

in which the diazo component is devoid of nitro groups, X is one of the group consisting of chloro and bromo halogeno alkyl groups having 1 to 3 carbons; Y is one of the group consisting of hydrogen, alkyl having 1 to 6 carbons, cyclohexyl, benzyl, ethoxyethyl and phenyl; Z is one of the group consisting of hydrogen and sulfonic acid; A is from the group consisting of hydrogen, methyl and methoxy; the arrow means diazotized and coupled; R is one of the group consisting of 2-amino-8-naphthol-6-sulfonic acid and the derivatives thereof in which the amino nitrogen is substituted by at least one of the group consisting of alkyl having 1 to 2 carbons, hydroxyethyl, cyclohexyl and benzyl, the azo bridge being attached to said naphthol in the 7-position thereof.

3. The dyestuff which in the form of its acid is represented by the formula

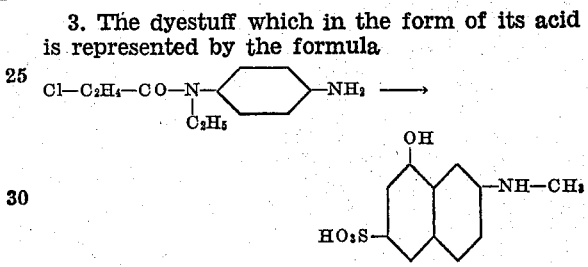

4. The dyestuff which in the form of its acid is represented by the formula

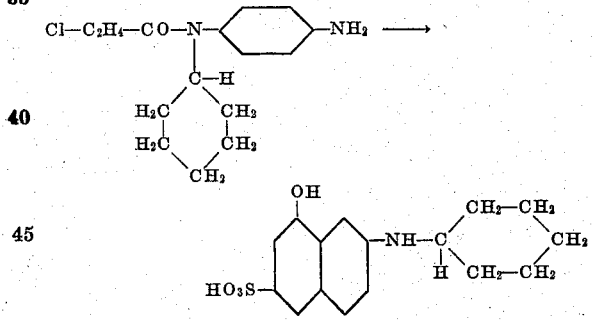

ARTHUR HOWARD KNIGHT.
WILLIAM ELLIOT STEPHEN.